US009369015B2

(12) United States Patent
Yabe et al.

(10) Patent No.: US 9,369,015 B2
(45) Date of Patent: Jun. 14, 2016

(54) PERMANENT MAGNET EMBEDDED MOTOR AND COMPRESSOR, BLOWER, AND REFRIGERATING AND AIR CONDITIONING APPARATUS USING PERMANENT MAGNET EMBEDDED MOTOR

(75) Inventors: Koji Yabe, Tokyo (JP); Hayato Yoshino, Tokyo (JP); Kazuhiko Baba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 210 days.

(21) Appl. No.: 14/232,406

(22) PCT Filed: Jul. 15, 2011

(86) PCT No.: PCT/JP2011/066244
§ 371 (c)(1),
(2), (4) Date: Jan. 13, 2014

(87) PCT Pub. No.: WO2013/011546
PCT Pub. Date: Jan. 24, 2013

(65) Prior Publication Data
US 2014/0232230 A1   Aug. 21, 2014

(51) Int. Cl.
*H02K 21/12* (2006.01)
*H02K 1/27* (2006.01)
(52) U.S. Cl.
CPC .............. *H02K 1/2706* (2013.01); *H02K 1/276* (2013.01); *H02K 2201/03* (2013.01); *H02K 2213/03* (2013.01)
(58) Field of Classification Search
CPC .................................. H02K 1/27; H02K 21/14
USPC ............. 310/156.11, 156.46, 156.56, 156.38
See application file for complete search history.

(56) References Cited

U.S. PATENT DOCUMENTS 7,042,127 B2   5/2006   Tsuruta et al.
7,652,405 B2   1/2010   Adaniya et al.
(Continued)

FOREIGN PATENT DOCUMENTS

CN        1538589 A      10/2004
CN      101043157 A       9/2007
(Continued)

OTHER PUBLICATIONS

Office Action mailed Jul. 31, 2015 issued in corresponding Chinese patent application No. 201180072332.5 (and partial English translation).

(Continued)

*Primary Examiner* — Jose Gonzalez Quinone
(74) *Attorney, Agent, or Firm* — Posz Law Group, PLC

(57) ABSTRACT

A permanent magnet embedded motor includes a rotor and permanent magnets. The outer circumferential surface of the rotor is formed by divided outer circumferential surfaces divided at equal angle intervals in a circumferential direction corresponding to permanent magnets. The divided outer circumferential surface is formed by a first curved surface, a radial direction distance of which from a rotor axis is maximized in a circumferential direction center of divided outer circumferential surface and second curved surfaces formed from the circumferential direction both ends to the circumferential direction center and crossing the first curved surface. The second curved surfaces are formed by—arcuate surfaces each having the rotor axis as a central axis. A distance between both ends of the first curved surface is smaller than the width of a permanent magnet in a direction orthogonal to a radial direction in the circumferential direction center.

10 Claims, 4 Drawing Sheets

(56) References Cited

U.S. PATENT DOCUMENTS

| | | |
|---|---|---|
| 7,843,101 B2 | 11/2010 | Ito et al. |
| 8,405,270 B2 | 3/2013 | Li et al. |
| 2002/0067096 A1 | 6/2002 | Yamamoto et al. |
| 2004/0256940 A1 | 12/2004 | Tsuruta et al. |
| 2007/0126304 A1 | 6/2007 | Ito et al. |
| 2007/0200447 A1 | 8/2007 | Adaniya et al. |
| 2010/0001607 A1* | 1/2010 | Okuma .................. H02K 1/276 310/156.53 |
| 2010/0176680 A1* | 7/2010 | Murakami ............. H02K 1/278 310/156.38 |
| 2011/0050022 A1* | 3/2011 | Li .......................... H02K 1/276 310/156.46 |

FOREIGN PATENT DOCUMENTS

| | | |
|---|---|---|
| CN | 101669266 A | 3/2010 |
| JP | 2002-010541 A | 1/2002 |
| JP | 2003-284275 A | 10/2003 |
| JP | 2004-260972 A | 9/2004 |
| JP | 2004-320989 A | 11/2004 |
| JP | 2005-168183 A | 6/2005 |
| JP | 2005-184918 A | 7/2005 |
| JP | 2007-159196 A | 6/2007 |
| JP | 2007-295708 A | 11/2007 |
| JP | 2008-099418 A | 4/2008 |
| WO | 2008/139675 A1 | 11/2008 |

OTHER PUBLICATIONS

International Search Report of the International Searching Authority mailed Oct. 18, 2011 for the corresponding international application No. PCT/JP2011/066244 (with English translation).

Office Action mailed Nov. 18, 2014 issued in corresponding JP patent application No. 2013-524530 (and English translation).

Extended European Search Report mailed on Oct. 29, 2015 in the corresponding European application No. 11869689.7.

* cited by examiner

PERMANENT MAGNET EMBEDDED MOTOR AND COMPRESSOR, BLOWER, AND REFRIGERATING AND AIR CONDITIONING APPARATUS USING PERMANENT MAGNET EMBEDDED MOTOR

CROSS REFERENCE TO RELATED APPLICATION

This application is a U.S. national stage application of International Patent Application No. PCT/JP2011/066244 filed on Jul. 15, 2011, the disclosure of which is incorporated herein by reference.

TECHNICAL FIELD

The present invention relates to a permanent magnet embedded motor and a compressor, a blower, and a refrigerating and air conditioning apparatus using the permanent magnet embedded motor.

BACKGROUND

There has been disclosed, for example, a permanent magnet embedded motor including: six divided outer circumferential surfaces obtained by dividing, at equal angle intervals, the outer circumferential surface of a magnetic body in the circumferential direction to correspond to permanent magnets; and nonmagnetic sections located among the six divided outer circumferential surfaces. The nonmagnetic sections are configured as concave sections, between which and a stator the air is interposed, among the six divided outer circumferential surfaces. The divided outer circumferential surface includes a first arcuate surface formed in the center in the circumferential direction and two second arcuate surfaces continuously ranging to both ends of the first arcuate surface and having a small curvature radius compared with the curvature radius of the first arcuate surface (e.g., Patent Literature 1).

PATENT LITERATURE

Patent Literature 1: Japanese Patent Application Laid-Open No. 2007-295708

However, in the related art, in a rotor core of the permanent magnet embedded motor, because the nonmagnetic sections are configured as the concave sections, between which and the stator the air is interposed, among the six divided outer circumferential surfaces, the width in a direction orthogonal to the radial direction of the permanent magnets embedded in the circumferential direction in the rotor core is determined depending on the depth of the concave sections. Therefore, there is a problem in that it is difficult to attain further magnetism reinforcement because of additional limitation on an increase in the width in the direction orthogonal to the radial direction of the permanent magnet.

SUMMARY

The present invention has been devised in view of the above and it is an object of the present invention to provide a permanent magnet embedded motor capable of realizing further magnetism reinforcement.

In order to solve above-mentioned problems and achieve the object of the present invention, there is provided a permanent magnet embedded motor including: a stator in which a plurality of teeth sections, around which stator winding is wound, are arranged in a circumferential direction at equal angle intervals via slot sections; and a rotor in which a plurality of permanent magnets are embedded at the equal angle intervals in the circumferential direction, the rotor being rotatably held on an inner circumferential surface of the stator, wherein an outer circumferential surface of the rotor is formed by a plurality of divided outer circumferential surfaces divided at the equal angle intervals in the circumferential direction to correspond to the permanent magnets, the divided outer circumferential surface is formed by: a first curved surface, a radial direction distance of which from an axis of the rotor is maximized in a circumferential direction center of the divided outer circumferential surface, formed from the circumferential center to circumferential direction both ends; and second curved surfaces formed from the circumferential direction both ends to the circumferential direction center of the divided outer circumferential surface by a substantially fixed arcuate surface having the axis of the rotor as a central axis and crossing the first curved surface, a radial direction distance between the arcuate surface and the inner circumferential surface of the stator being larger than a radial direction distance between the first curved surface and the inner circumferential surface of the stator, a distance between both ends of the first curved surface crossing the second curved surface is smaller than width of the permanent magnets in a direction orthogonal to a radial direction in the circumferential direction center of the divided outer circumferential surface.

According to the present invention, there is an effect that it is possible to realize further magnetism reinforcement of the permanent magnet embedded motor.

DETAILED DESCRIPTION

A permanent magnet embedded motor and a compressor, a blower, and a refrigerating and air conditioning apparatus using the permanent magnet embedded motor according to an embodiment of the present invention are explained below with reference to the accompanying drawings. Note that the present invention is not limited by the embodiment explained below.

Embodiment.

Figure 1:
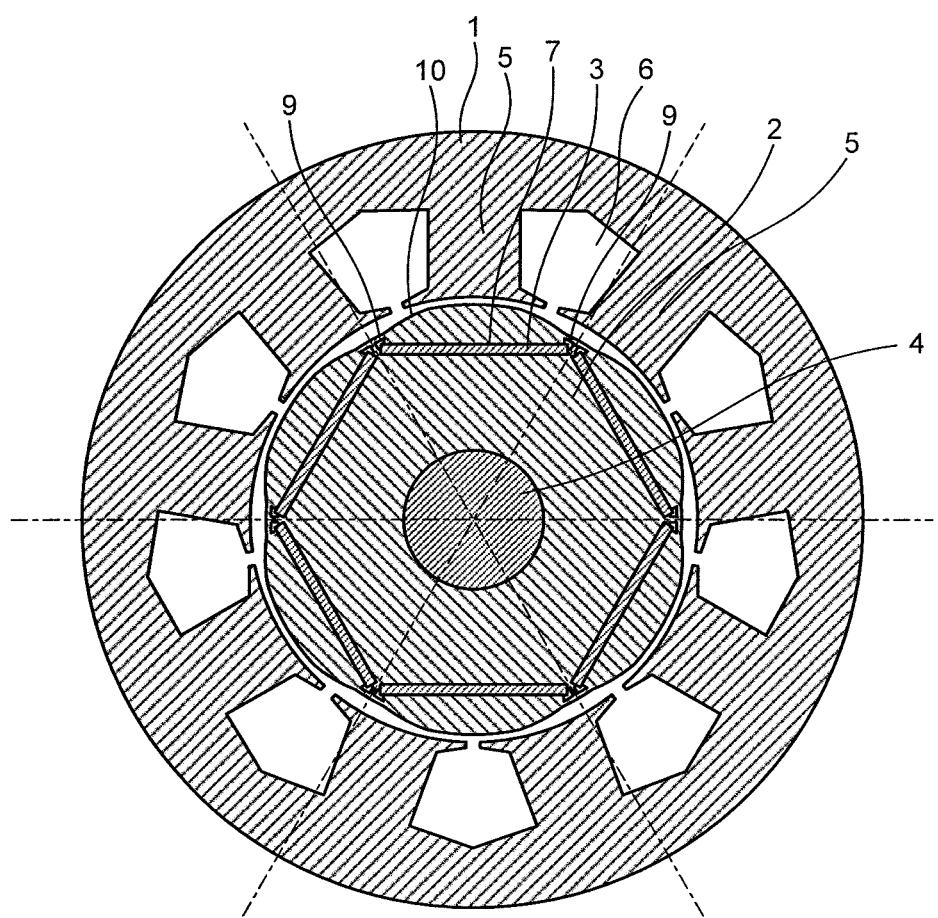
FIG. 1 is a cross sectional view of a permanent magnet embedded motor according to an embodiment.

FIG. 1 is a cross sectional view of a permanent magnet embedded motor according to an embodiment. As shown in FIG. 1, the permanent magnet embedded motor according to the embodiment includes a stator 1, a rotor 2, a plurality of permanent magnets 3, and a rotating shaft 4.

The stator 1 is arranged to surround the rotor 2 with the rotating shaft 4 set as a central axis. A plurality of teeth sections 5, around which stator winding is wound, are arranged in the inner circumference of the stator 1 in the circumferential direction at substantially equal angle intervals via slot sections 6. In some cases, the stator 1 has a concentrated winding structure in which the stator winding is wound around each of the teeth sections 5 and, in other cases, the stator 1 has a distributed winding structure in which the stator winding is wound around the plurality of teeth sections 5. The stator 1 can be applied to both the cases. In an example shown in FIG. 1, nine teeth sections 5 and nine slot sections 6 are respectively configured. The number of the teeth sections 5 and the slot sections 6 is not limited to nine and can be smaller than nine or can be equal to or larger than nine.

The rotor 2 is formed by punching, with a die, a thin electromagnetic steel plate (e.g., having plate thickness of about 0.1 to 1.0 mm; a non-oriented electromagnetic steel plate (crystal axis directions of crystals are arranged as randomly as possible such that the steel plate does not unevenly show a magnetic characteristic in a specific direction of the steel plate) and laminating a predetermined number (a plurality of) the electromagnetic steel plates.

In the rotor 2, a plurality of permanent magnet insertion holes 7 having respective rectangular cross sections are formed in the circumferential direction at substantially equal intervals. Air gaps 9 for separating the permanent magnets 3 and a thin section of the outer circumferential surface of the rotor 2 are formed at both ends of the permanent magnet insertion holes 7. A shaft hole 8, in which the rotating shaft 4 is fit, is formed in substantially the center of the rotor 2. As the permanent magnet 3, for example, rare earth or the like containing neodymium, iron, and boron as main components is formed in a shape of a flat plate and both the surfaces of the flat plate are respectively magnetized as an N pole and an S pole. The permanent magnets 3 are respectively embedded in the permanent magnet insertion holes 7 of the rotor 2 such that the N pole surfaces and the S pole surfaces alternate. Consequently, the rotor 2 is formed. Note that the number of magnetic poles of the rotor 2 can be any number equal to or larger than two. However, in the example shown in FIG. 1, the number of magnetic poles of the rotor 2 is six.

The outer circumferential surface of the rotor 2 is formed by a plurality of divided outer circumferential surfaces 10 divided in the circumferential direction at substantially equal angle intervals to respectively correspond to the plurality of (six) permanent magnets 3. The sections of the rotor 2 divided for each of the divided outer circumferential surfaces 10 are hereinafter referred to as "magnetic pole sections".

Figure 2:
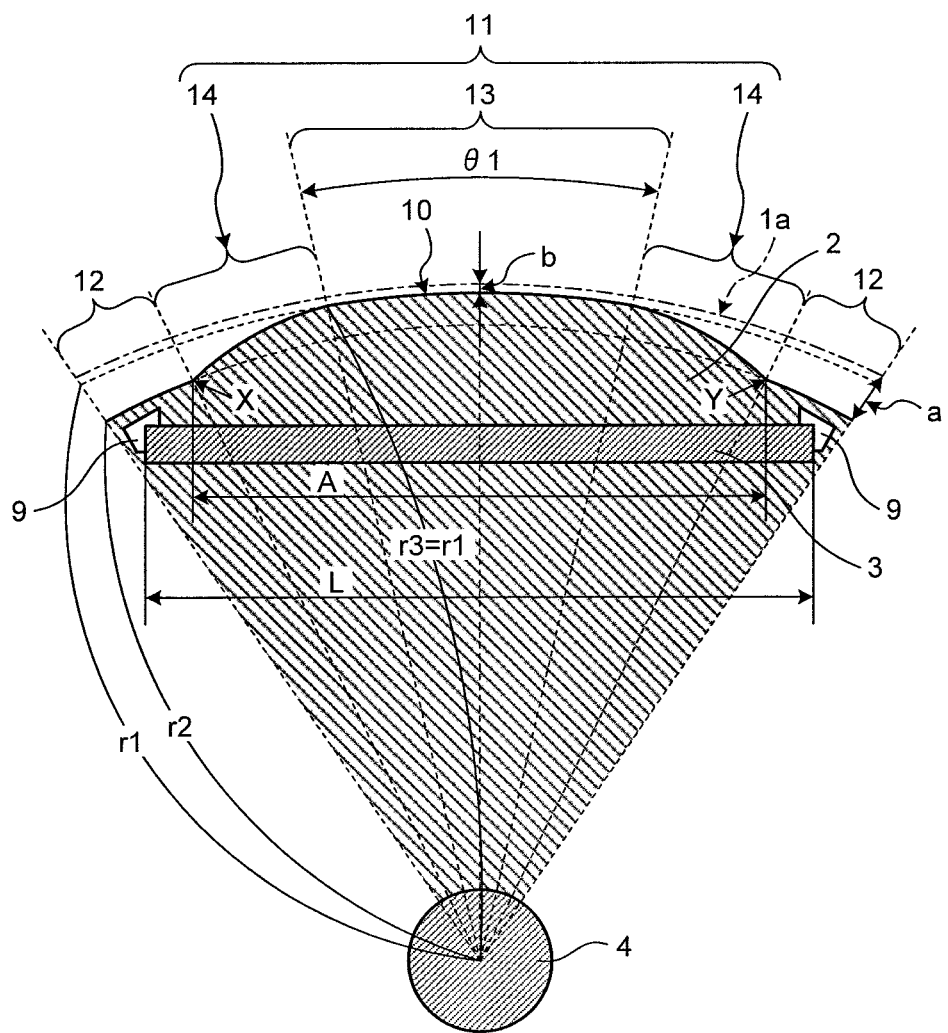
FIG. 2 is an enlarged view of a magnetic pole section of a rotor of the permanent magnet embedded motor shown in FIG. 1.

The structure of the magnetic pole section of the rotor 2, which is a characteristic part of the permanent magnet embedded motor according to the embodiment, is explained with reference to FIG. 2. FIG. 2 is an enlarged view of the magnetic pole section of the rotor of the permanent magnet embedded motor shown in FIG. 1.

As shown in FIG. 2, the divided outer circumferential surface 10 configuring the magnetic pole section is configured by combining a plurality of curved surfaces. More specifically, the divided outer circumferential surface 10 is formed by a first curved surface 11, a radial direction distance (r1) of which from the axis of the rotor 2 is maximized in the circumferential direction center of the divided outer circumferential surface 10, formed from the circumferential direction center to circumferential direction both ends and second curved surfaces 12, a radial direction distance (r2) from the axis of the rotor 2 is minimized at the circumferential direction both ends of the divided outer circumferential surface 10, formed from the circumferential direction both ends to the circumferential direction center and crossing the first curved surface. Note that the first curved surface 11 is configured by a third curved surface 13 in a predetermined section formed from the circumferential direction center of the divided outer circumferential surface 10 to the circumferential direction both ends and fourth curved surfaces 14 in sections from ends of the third curved surface 13 to crossing parts with the second curved surfaces 12.

The second curved surfaces 12 are formed by, in a part or all of sections extending from circumferential direction both ends of the divided outer circumferential surface 10 toward the circumferential direction center, arcuate surfaces with the radius r2 having the axis of the rotor 2 as the central axis. If the second curved surfaces 12 are formed in this way, as shown in FIG. 2, the radius r2 of arcuate surfaces forming a part or all of the sections on the second curved surfaces 12 is smaller than the radial direction distance r1 from the axis of the rotor 2 in the circumferential direction center on the first curved surface 11 (r1>r2). A radial direction distance "a" between the arcuate surfaces forming a part or all of the sections on the second curved surfaces 12 and an inner circumferential surface 1a of the stator 1 is larger than a radial direction distance "b" between the rotor 2 and the inner circumferential surface 1a of the stator 1 in the circumferential direction center on the first curved surface 11. The radial direction distance "a" between the arcuate surfaces forming a part or all of the sections on the second curved surfaces 12 and the inner circumferential surface 1a of the stator 1 is substantially fixed.

Figure 3:
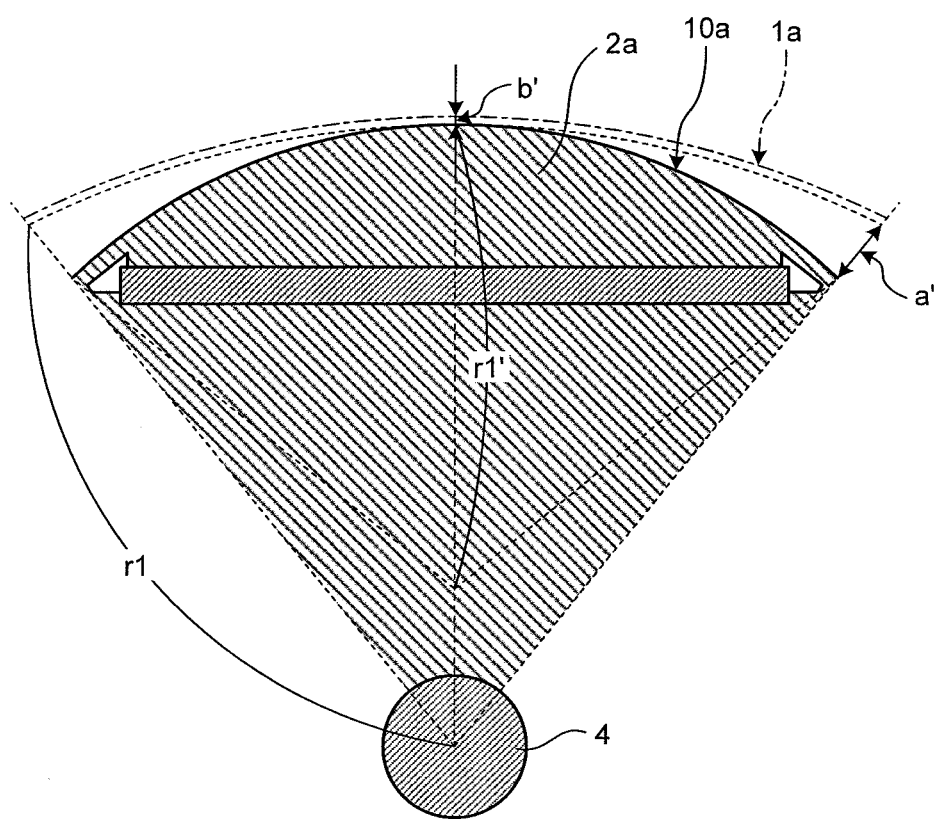
FIG. 3 is an enlarged view of a magnetic pole section of a rotor of a permanent magnet embedded motor in the past.

It is preferable that a variation of the magnetic flux density in the outer circumference of the rotor 2 is a sine wave shape. It is desirable that the magnetic flux density at the circumferential direction both ends of the divided outer circumferential surface 10 is a value close to 0 T. FIG. 3 is an enlarged view of a magnetic pole section of a rotor of a permanent magnet embedded motor in the past. As shown in FIG. 3, in the permanent magnet embedded motor in the past, in general, a divided outer circumferential surface 10a of a rotor 2a is formed by a single arcuate surface having a radius r1', which is smaller than the radial direction distance r1 from the axis of the rotor 2a in the circumferential direction center of the divided outer circumferential surface 10, on divided outer circumferential surfaces 10a. In this case, a radial direction distance b' between the divided outer circumferential surface 10a of the rotor 2a and the inner circumferential surface 1a of the stator 1 in the circumferential direction center of the divided outer circumferential surface 10 is the smallest. A radial direction distance a' between the divided outer circumferential surface 10a of the rotor 2a and the inner circumferential surface 1a of the stator 1 at the circumferential direction both ends of the divided outer circumferential surface 10 is the largest. By forming the magnetic pole section in this way, the magnetic flux density in the circumferential direction center of the divided outer circumferential surface 10 having the smallest radial direction distance is large and the magnetic flux density gradually decreases as the radial direction distance increases in the circumferential direction toward the circumferential direction both ends of the divided outer circumferential surface 10. Therefore, a variation of the magnetic flux density in the outer circumference of the rotor 2a is close to the sine wave shape and a torque ripple can be reduced.

On the other hand, the radial direction distance a' between the divided outer circumferential surface 10 of the rotor 2 and the inner circumferential surface 1a of the stator 1 is large near the circumferential direction both ends of the divided outer circumferential surface 10. Therefore, it is difficult to attain further magnetism reinforcement because of additional limitation on an increase in the width of the permanent magnets 3 in the direction orthogonal to the radial direction in the circumferential direction center of the divided outer circumferential surface 10.

The radial direction distance "a" between the arcuate surfaces formed in a part or all of the sections (in the example shown in FIG. 2, all of the sections) on the second curved surfaces 12 and the inner circumferential surface 1a of the stator 1 is larger than the radial direction distance "b" between the rotor 2 and the inner circumferential surface 1a of the stator 1 in the circumferential direction center of the divided outer circumferential surface 10 of the first curved surface 11 (see FIG. 2). Therefore, the magnetic flux density at the circumferential direction both ends of the divided outer circumferential surface 10 is extremely small compared with the magnetic flux density near the circumferential direction center of the divided outer circumferential surface 10. Therefore, even if the gap "a" between the stator 1 and the rotor 2 near the circumferential direction both ends of the divided outer circumferential surface 10 is substantially fixed, the influence on the magnetic flux density in the outer circumference of the rotor 2 is considered to be small.

Therefore, in this embodiment, as explained above, a part or all of the sections (in the example shown in FIG. 2, all of the sections) on the second curved surfaces 12 are formed by the arcuate surfaces, whereby the radial direction distance "a" between the arcuate surfaces and the inner circumferential surface 1a of the stator 1 near the circumferential direction both ends of the divided outer circumferential surface 10 is substantially fixed. A distance A between both ends X and Y of the first curved surface 11 is set shorter than width L of the permanent magnets 3 in a direction orthogonal to the radial direction in the circumferential direction center of the divided outer circumferential surface 10 (L>A). Consequently, it is possible to attain further magnetisms reinforcement of the permanent magnet embedded motor while suppressing the influence on a torque ripple.

Other than a configuration in which the permanent magnets 3 are arranged in a V shape and the flat shape (a rectangular or a trapezoid) shown in FIGS. 1 and 2, for example, the present invention can also be applied to configurations including the permanent magnets 3 arranged in an arcuate shape, a tile shape, and the like. In all the cases, a liner distance between both ends of the permanent magnet 3 closest to the circumferential direction both ends of the divided outer circumferential surface 10 only has to be set to L described above.

As shown in FIG. 2, if the predetermined section formed from the circumferential direction center to the circumferential direction both ends of the divided outer circumferential surface 10 on the first curved surface 11, i.e., the third curved surface 13 is formed by an arcuate surface having the axis of the rotor 2 as the central axis and a radius r3 of the arcuate surface is set equal to the radial direction distance r1 from the axis of the rotor 2 in the circumferential direction center on the first curved surface 11 (r3=r1), the radial direction distance "b" between the third curved surface 13 and the inner circumferential surface 1a of the stator 1 is kept substantially fixed. Consequently, it is possible to attain an increase in magnetism of the permanent magnets 3.

In the rotor 2a of the permanent magnet embedded motor in the past shown in FIG. 3, the radial direction distance between the divided outer circumferential surface 10a of the rotor 2a and the inner circumferential surface 1a of the stator 1 increases in the magnetic pole sections from the circumferential direction center toward the circumferential direction both ends of the divided outer circumferential surface 10a. Therefore, an equivalent gap increases and magnetic fluxes decrease.

As explained above, the third curved surface 13 is formed by the arcuate surface having the axis of the rotor 2 as the central axis and the radius r3 of the arcuate surface is set equal to the radial direction distance r1 from the axis of the rotor 2 in the circumferential direction center on the first curved surface 11, whereby the radial direction distance "b" between the third curved surface 13 and the inner circumferential surface 1a of the stator 1 is kept substantially fixed. Consequently, because the equivalent gap decreases and the magnetic fluxes increase, the magnetism of the permanent magnet embedded motor is further reinforced and it is possible to attain high efficiency.

As shown in FIG. 2, the axis of the rotor 2 is set as the central axis of the third curved surface 13 and the second curved surfaces 12, whereby the radial direction distances between the circumferential direction center of the divided outer circumferential surface 10 and the stator 1 and the rotor 2 at the circumferential direction both ends are respectively fixed. Consequently, it is easy to manage the radial direction distance between the stator 1 and the rotor 2 and it is possible to improve productivity.

Note that, as explained above, the radial direction distance "a" between the stator 1 and the rotor 2 near the circumferential direction both ends of the divided outer circumferential surface 10 is larger than the radial direction distance "b" between the stator 1 and the rotor 2 in the circumferential direction center of the divided outer circumferential surface 10. Therefore, in managing the radial direction distance between the stator 1 and the rotor 2, it is easier to manage the radial direction distance "a" between the stator 1 and the rotor 2 near the circumferential direction both ends of the divided outer circumferential surface 10 than managing the radial direction distance "b" between the stator 1 and the rotor 2 near the circumferential direction center of the divided outer circumferential surface 10.

In general, in an apparatus for managing the radial direction distance between the stator 1 and the rotor 2, a jig or the like having fixed or larger thickness is inserted to manage the radial direction distance. Therefore, if the radial direction distance between the stator 1 and the rotor 2 near the circumferential direction both ends of the divided outer circumferential surface 10, in which the radial direction distance between the stator 1 and the rotor 2 is large, is managed, because the jig cannot be inserted into sections other than sections near the circumferential direction both ends of the divided outer circumferential surface 10, the radial direction distance only has to be determined only by possibility of insertion of the jig without managing an inserting position of the jig. Therefore, it is possible to attain improvement of productivity.

The fourth curved surfaces 14 forming the first curved surface 11 are present to continuously connecting the third curved surface 13 and the second curved surfaces 12. When the fourth curved surfaces 14 are formed in a shape closer to a straight line, a torque ripple increases. Therefore, it is preferable to form the fourth curved surfaces 14 from arcuate surfaces. It is preferable that the third curved surface 13 and the second curved surfaces 12 are continuously connected as much as possible. Therefore, in this embodiment, the radius of the arcuate surfaces forming the fourth curved surfaces 14 is set smaller than the arcuate surfaces forming the second curved surfaces 12 and the arcuate surface forming the third curved surface 13. Consequently, a variation of the magnetic flux density generated from the rotor 2 is close to the sine wave shape and it is possible to reduce a torque ripple. Note that, as explained above, the radius r3 (=r1) of the arcuate surface forming the third curved surface 13 is larger than the radius r2 of the arcuate surfaces forming the second curved surfaces 12. Therefore, if the radius of the arcuate surfaces forming the fourth curved surfaces 14 is set smaller than the radius r2 of the arcuate surfaces forming the second curved surfaces 12, the condition explained above is satisfied.

Figure 4:
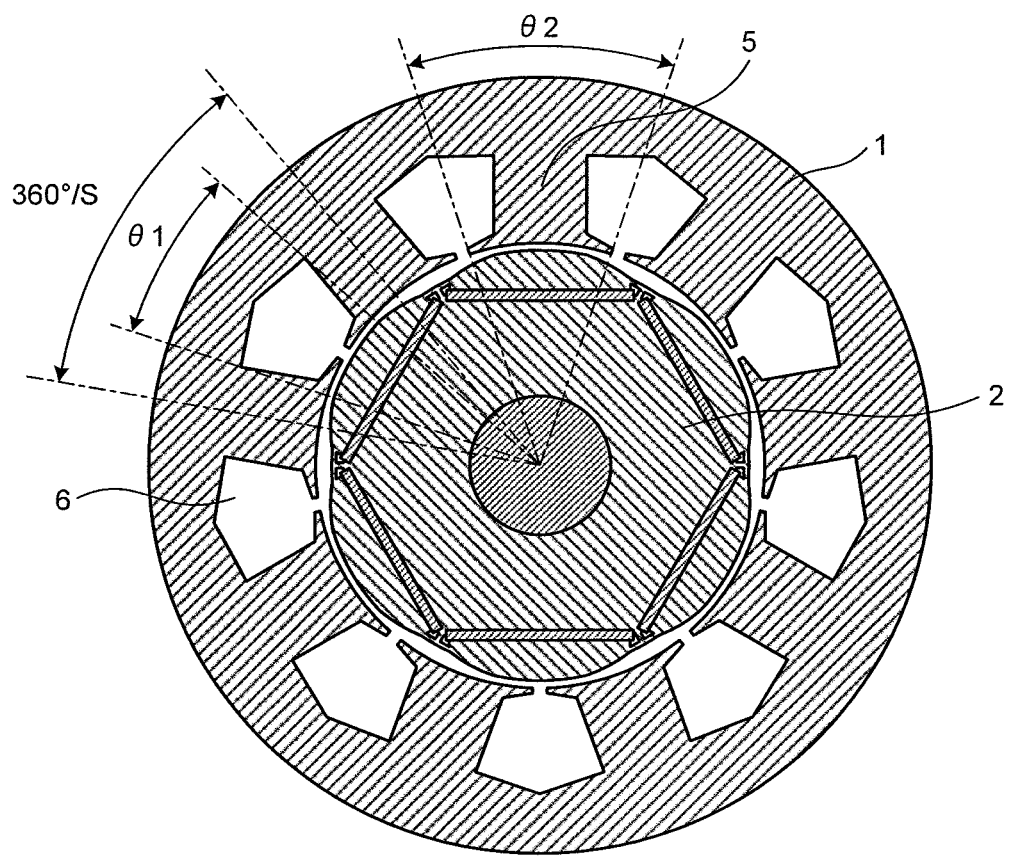
FIG. 4 is a diagram for explaining a condition of an angle between both ends of an arcuate surface that forms a third curved surface.

FIG. 4 is a diagram for explaining a condition of an angle between both ends of the arcuate surface forming the third curved surface. When a predetermined section in which the width on the divided outer circumferential surface 10 of the arcuate surface forming the third curved surface 13, i.e., the radial direction distance between the stator 1 and the rotor 2 is kept substantially fixed near the circumferential direction center of the divided outer circumferential surface 10 increases, a section is sometimes formed in which, even if the rotor 2 rotates, a magnetic flux flowing into the teeth sections 5 formed in the stator 1 does not change. In this case, an induced voltage is less easily generated and the induced voltage includes a lot of higher harmonic waves. Therefore, a torque ripple increases.

Therefore, as shown in FIG. 4, when the number of slots formed in the stator 1 is represented as S, if an angle between both ends θ1 (see FIG. 2) of the arcuate surface forming the third curved surface 13 is set to satisfy (θ1<360°/S), there is no section in which the radial direction distance between the rotor 2 and the stator 1 does not change with respect to the teeth sections 5 of the stator 1. Therefore, it is possible to reduce higher harmonic waves included in an induced voltage and reduce a torque ripple.

The magnetic flux flowing into the teeth sections 5 depends on an angle between distal ends θ2 of the teeth sections 5 of the inner circumferential surface 1a of the stator 1. Therefore, it is more desirable that (θ1<θ2) is satisfied (see FIG. 4).

When a section in which the width on the divided outer circumferential surface 10 of the arcuate surfaces forming the second curved surfaces 12, i.e., the radial direction distance between the stator 1 and the rotor 2 is kept substantially fixed near the circumferential direction both ends of the divided outer circumferential surface 10 increases, the influence on the magnetic flux density in the outer circumference of the rotor 2 increases and a torque ripple increases. Therefore, if the radial direction distance between the stator 1 and the rotor 2 gradually increases from a position at a predetermined angle from the circumferential direction both ends of the divided outer circumferential surface 10 on the second curved surfaces 12 toward the circumferential direction both ends of the divided outer circumferential surface 10 in the circumferential direction, it is possible to change the magnetic flux flowing into the teeth sections 5 formed in the stator 1. Therefore, the variation of the magnetic flux density in the outer circumference of the rotor 2 is closer to the sine wave shape and it is possible to reduce a torque ripple.

Note that, for example, when the number of slots formed in the stator 1 is represented as S, the predetermined angle from the circumferential direction both ends of the divided outer circumferential surface 10 on the second curved surfaces 12 only has to be (360°/S/4). The radial direction distance between the stator 1 and the rotor 2 only has to gradually increase from a position where the angle from the circumferential direction both ends of the divided outer circumferential surface 10 is at least (360°/S/4) on the second curved surfaces 12 toward the circumferential direction both ends of the divided outer circumferential surface 10 in the circumferential direction.

A section to the position at the predetermined angle from the circumferential direction both ends of the divided outer circumferential surface 10 on the second curved surfaces 12 assumes a convex shape in a centrifugal direction, whereby it is possible to bring the magnetic flux density in the outer circumference of the rotor 2 close to the sine wave shape.

As explained above, it is desirable that the variation of the magnetic flux density in the outer circumference of the rotor 2 is the sine wave shape. It is desirable that a variation of the magnetic flux density near the circumferential direction center of the divided outer circumferential surface 10 is small and the variation of the magnetic flux density increases toward the circumferential direction both ends of the divided outer circumferential surface 10.

It is also possible to form the curved surfaces (i.e., the third curved surface 13 and the fourth curved surfaces 14 forming the first curved surface 11, and the second curved surfaces 12) forming the divided outer circumferential surface 10 of the rotor 2 to be a concave shape in the centrifugal direction. However, in this case, the variation of the magnetic flux density in the outer circumference of the rotor 2 is large in the circumferential direction center of the divided outer circumferential surface 10 and is small at the circumferential direction both ends of the divided outer circumferential surface 10. That is, it is not preferable to form the curved surfaces forming the outer circumferential surface of the rotor 2 in a concave shape in the centrifugal direction because the variation of the magnetic flux density in the outer circumference of the stator cannot be brought close to the sine wave shape.

In particular, when the number of slots formed in the stator 1 is represented as S, the section to the position where the angle from the circumferential direction both ends of the divided outer circumferential surface 10 is at least (360°/S/4) on the second curved surfaces 12 is a section in which the magnetic flux density increases from 0 T. Therefore, it is important to change a variation of a magnetic flux in this section to the sine wave shape. Therefore, the section to the position where the angle from the circumferential direction both ends of the divided outer circumferential surface 10 is at least (360°/S/4) on the second curved surfaces 12 assumes a convex shape to the centrifugal direction, whereby it is possible to bring the variation of the magnetic flux density in the outer circumference of the rotor 2 close to the sine wave.

Further, the curved surfaces forming the divided outer circumferential surface 10 of the rotor 2 assume a convex shape in the centrifugal direction, whereby it is possible to bring the variation of the magnetic flux density in the outer circumference of the rotor 2 closer to the sine wave.

As shown in FIGS. 1 and 2, in the permanent magnet embedded motor according to the embodiment, the air gaps for separating the permanent magnets 3 and the thin section of the outer circumference of the rotor 2 present near the ends of the permanent magnets 3 are provided.

The thin section of the outer circumference of the rotor 2 is weaker than the other parts of the rotor 2 in its strength. Therefore, the air gaps 9 are provided to prevent, when the permanent magnets 3 move in the permanent magnet insertion holes 7, the permanent magnets 3 from coming into contact with the thin section of the outer circumference of the rotor 2. It is possible to prevent, with the air gaps, even if the permanent magnets 3 move in the permanent magnet insertion holes 7, the permanent magnets 3 from coming into contact with the thin section of the outer circumference of the rotor 2. Note that the air gaps 9 also have a function of reducing a leak magnetic flux.

As explained above, in the permanent magnet embedded motor according to the embodiment, the outer circumferential surface of the rotor is configured by the plurality of divided outer circumferential surfaces divided at the equal angle intervals in the circumferential direction to correspond to the permanent magnets. The divided outer circumferential surface is formed by the first curved surface, a radial direction distance of which from the axis of the rotor is maximized in the circumferential direction center of the divided outer circumferential surface, formed from the circumferential direction center to the circumferential direction both ends and the second curved surfaces, the radial direction of which from the axis of the rotor is minimized at the circumferential direction both ends of the divided outer circumferential surface, formed from the circumferential direction both ends to the circumferential direction center and crossing the first curved surface. The second curved surfaces are formed by, in a part or all of the sections extending from the circumferential direction both ends to the circumferential direction center of the divided outer circumferential surface, the arcuate surfaces having the axis of the rotor as the central axis. The distance between both ends of the first curved surface is set to be smaller than the width of the permanent magnets in the direction orthogonal to the radial direction in the circumferential direction center of the divided outer circumferential surface. Therefore, it is possible to expand an arrangement interval of the permanent magnets in the radial direction and increase the width of the permanent magnets in the direction orthogonal to the radial direction in the circumferential direction center of the divided outer circumferential surface. It is possible to attain further magnetism reinforcement of the permanent magnet embedded motor while suppressing the influence on a torque ripple.

The predetermined section formed from the circumferential direction center to the circumferential direction both ends of the divided outer circumferential surface on the first curved surface, i.e., the third curved surface is formed by the arcuate surface having the axis of the rotor as the central axis. The radius of the arcuate surface is set equal to the radial direction distance from the axis of the rotor in the circumferential direction center of the divided outer circumferential surface. Therefore, because the equivalent gap decreases and the magnetic fluxes increase, the magnetism of the permanent magnet embedded motor is further reinforced and it is possible to attain high efficiency.

The axis of the rotor is set as the central axis of the third curved surface and the second curved surfaces, whereby the radial direction distances between the circumferential direction center of the divided outer circumferential surface and the stator and the rotor at the circumferential direction both ends are respectively fixed. Therefore, it is easy to manage the radial direction distance between the stator and the rotor and it is possible to improve productivity.

The predetermined sections of the first curved surface, i.e., the sections from the ends of the arcuate surface forming the third curved surface to the crossing parts with the second curved surfaces, i.e., the fourth curved surfaces are formed by the arcuate surfaces. The radius of the arcuate surfaces is set smaller than the radius of the arcuate surfaces forming the second curved surfaces. Therefore, the variation of the density of the magnetic flux generated from the rotor is close to the sine wave shape and it is possible to reduce a torque ripple.

The angle between both ends of the arcuate surface forming the third curved surface is set to be smaller than (360°/the number of slots), whereby there is no section in which the radial direction distance between the rotor and the stator does not change with respect to the teeth sections of the stator. Therefore, it is possible to reduce higher harmonic waves included in an induced voltage and reduce a torque ripple.

Note that the magnetic flux flowing into the teeth sections 5 depends on the angle between distal ends of the teeth sections 5 of the inner circumferential surface 1a of the stator 1. Therefore, it is more preferable to set the angle between both ends of the arcuate surface forming the third curved surface smaller than the angle between distal ends of the teeth sections.

When the section in which the width on the divided outer circumferential surface of the arcuate surfaces forming the second curved surfaces, i.e., the radial direction distance between the stator and the rotor is kept substantially fixed near the circumferential direction both ends of the divided outer circumferential surface increases, the influence on the magnetic flux density in the outer circumference of the rotor increases and a torque ripple increases. To prevent this, the radial direction distance between the rotor and the inner circumferential surface of the stator at the circumferential direction both ends of the divided outer circumferential surface is set larger than the radial direction distance between the rotor and the inner circumferential surface of the stator in the position at the predetermined angle from the circumferential direction both ends of the divided outer circumferential surface on the arcuate surfaces forming the second curved surfaces. Therefore, it is possible to change the magnetic flux flowing into the teeth sections formed in the stator. The variation of the magnetic flux density in the outer circumference of the rotor is closer to the sine wave shape. It is possible to reduce a torque ripple.

More preferably, when the number of slots formed in the stator is represented as S, the radial direction distance between the stator and the rotor only has to be gradually increased from the position where the angle from the circumferential direction both ends of the divided outer circumferential surfaces on the second curved surfaces is at least (360°/S/4) toward the circumferential direction both ends.

It is desirable that the variation of the magnetic flux density in the outer circumference of the rotor is the sine wave shape, i.e., the variation of the magnetic flux density is small near the circumferential direction center of the divided outer circumferential surface and increases toward the circumferential direction both ends of the divided outer circumferential surface. However, when the curved surfaces (i.e., the third curved surface and the fourth curved surfaces forming the first curved surface, and the second curved surfaces) forming the divided outer circumferential surface of the rotor is formed to be the concave shape in the centrifugal direction, the variation of the magnetic flux distance in the outer circumference of the rotor is large in the circumferential direction center of the divided outer circumferential surface and is small at the circumferential direction both ends of the divided outer circumferential surface. This is not preferable because the variation of the magnetic flux density in the outer circumference of the stator cannot be brought close to the sine wave shape.

In particular, when the number of slots formed in the stator is represented as S, the section to the position where the angle from the circumferential direction both ends of the divided outer circumferential surface is at least (360°/S/4) on the second curved surfaces is a section in which the magnetic flux density increases from 0 T. Therefore, it is important to change a variation of a magnetic flux in this section to the sine wave shape. Therefore, the section to the position where the angle from the circumferential direction both ends of the divided outer circumferential surface is at least (360°/S/4) on the second curved surfaces assumes the convex shape to the centrifugal direction, whereby it is possible to bring the variation of the magnetic flux density in the outer circumference of the rotor close to the sine wave.

Further, the curved surfaces forming the divided outer circumferential surface of the rotor assume a convex shape in the centrifugal direction, whereby it is possible to bring the variation of the magnetic flux density in the outer circumference of the rotor closer to the sine wave.

The air gaps for separating the permanent magnets and the thin section of the outer circumferential surface of the rotor are formed at both the ends of the permanent magnet insertion holes in which the permanent magnets are embedded, whereby it is possible to reduce a leak magnetic flux and prevent, even if the permanent magnets move in the permanent magnet insertion holes, the permanent magnets from coming into contact with the thin section of the outer circumference of the rotor.

The permanent magnet embedded motor in this embodiment is suitably used in a compressor or a blower. It is possible to attain a reduction in size and high efficiency of the compressor or the blower.

Further, the compressor or the blower applied with the permanent magnet embedded motor in this embodiment is used in a refrigerating and air conditioning apparatus, whereby it is possible to attain a reduction in size and high efficiency of the refrigerating and air cooling apparatus.

Note that the configuration explained in the embodiment is an example of the configuration of the present invention. It goes without saying that the configuration can be combined with other publicly-known technologies and the configuration can be changed, for example, a part of the configuration can be omitted without departing from the spirit of the present invention.

The invention claimed is:

1. A permanent magnet embedded motor comprising:
a stator in which a plurality of teeth sections, around which stator winding is wound, are arranged in a circumferential direction at equal angle intervals via slot sections; and
a rotor in which a plurality of permanent magnets are embedded at the equal angle intervals in the circumferential direction, the rotor being rotatably held on an inner circumferential surface of the stator, wherein
an outer circumferential surface of the rotor includes a plurality of divided outer circumferential surfaces divided at the equal angle intervals in the circumferential direction to correspond to the permanent magnets, the plurality of divided outer circumferential surfaces being divided by radial lines, each of which connects a center of the rotor and a middle point between adjacent ends of the plurality of permanent magnets so that a pair of the radial lines define each of the plurality of divided outer circumferential surfaces,
each of the plurality of divided outer circumferential surfaces includes:
a first curved surface, a radial direction distance of which from an axis of the rotor is maximized in a circumferential direction center of the divided outer circumferential surface, formed from the circumferential center to circumferential direction both ends, the first curved surface includes, in a predetermined section formed from the circumferential direction center to the circumferential direction both ends of the divided outer circumferential surface, a first arcuate surface having the axis of the rotor as a central axis and having a radial direction distance from the axis of the rotor in the circumferential direction center of the divided outer circumferential surface as a first radius, and
second curved surfaces formed from the circumferential direction both ends to the circumferential direction center of the divided outer circumferential surface by a substantially fixed second arcuate surface having the axis of the rotor as a central axis and crossing the first curved surface, a radial direction distance between the second arcuate surface and the inner circumferential surface of the stator being larger than a radial direction distance between the first curved surface and the inner circumferential surface of the stator, wherein
the first curved surface further includes, in a section from ends of the predetermined section to crossing parts with the second curved surfaces, a third arcuate surface having a third radius smaller than a second radius of the second arcuate surface forming each of the second curved surfaces, and
a distance between both ends of the first curved surface crossing the second curved surface is smaller than width of the permanent magnets in a direction orthogonal to a radial direction in the circumferential direction center of the divided outer circumferential surface.

2. The permanent magnet embedded motor according to claim 1, wherein an angle between both ends of the predetermined section is smaller than (360°/a number of slots).

3. The permanent magnet embedded motor according to claim 2, wherein the angle between both ends of the predetermined section is smaller than an angle between distal ends of the teeth section.

4. The permanent magnet embedded motor according to claim 1, wherein, in the rotor, air gaps for separating the permanent magnets and a thin section of the outer circumferential surface are formed at both ends of permanent magnet insertion holes in which the permanent magnets are embedded.

5. A compressor applied with the permanent magnet embedded motor according to claim 1.

6. A refrigerating and air conditioning apparatus mounted with the compressor according to claim 5.

7. A blower applied with the permanent magnet embedded motor according to claim 1.

8. A refrigerating and air conditioning apparatus mounted with the blower according to claim 7.

9. The permanent magnet embedded motor according to claim 1, wherein
the first radius of the first arcuate surface is larger than the third radius of the third arcuate surface, and
the second radius of the second arcuate surface is smaller than the first radius of the first arcuate surface and is larger than the third radius of the third arcuate surface.

10. The permanent magnet embedded motor according to claim 1, wherein the third arcuate surface gradually slopes to connect the first arcuate surface to the second arcuate surface.

* * * * *